(12) United States Patent
Gayler

(10) Patent No.: US 9,262,634 B2
(45) Date of Patent: Feb. 16, 2016

(54) MEMORY CONTENT PROTECTION

(71) Applicant: SECURE SOFTWARE PTY LTD, Somerton Park (AU)

(72) Inventor: Matthew Gayler, Somerton Park (AU)

(73) Assignee: SECURE SOFTWARE PTY LTD, Somerton Park (AU)

( * ) Notice: Subject to any disclaimer, the term of this patent is extended or adjusted under 35 U.S.C. 154(b) by 0 days.

(21) Appl. No.: 14/367,935

(22) PCT Filed: Dec. 24, 2012

(86) PCT No.: PCT/AU2012/001601
§ 371 (c)(1),
(2) Date: Jun. 22, 2014

(87) PCT Pub. No.: WO2013/091025
PCT Pub. Date: Jun. 27, 2013

(65) Prior Publication Data
US 2015/0135321 A1     May 14, 2015

(30) Foreign Application Priority Data
Dec. 23, 2011    (AU) .............................. 2011905403

(51) Int. Cl.
*G06F 12/12*     (2006.01)
*G06F 21/56*     (2013.01)
(Continued)

(52) U.S. Cl.
CPC .......... *G06F 21/561* (2013.01); *G06F 11/1446* (2013.01); *G06F 11/1451* (2013.01); *G06F 21/562* (2013.01); *G06F 21/568* (2013.01); *G06F 2201/84* (2013.01); *G06F 2221/2115* (2013.01)

(58) Field of Classification Search
CPC ..................... G06F 2221/0782; G06F 11/2056
See application file for complete search history.

(56) References Cited

U.S. PATENT DOCUMENTS

| 7,366,859 B2 | 4/2008 | Per et al. |
| 7,702,867 B2 | 4/2010 | Coombs et al. |

(Continued)

FOREIGN PATENT DOCUMENTS

WO         96/25801 A1    8/1996

OTHER PUBLICATIONS

International Search Report received for PCT Appl. No. PCT/AU2012/001601, dated Mar. 25, 2013, 5 pages.

(Continued)

*Primary Examiner* — Venkat Perungavoor
(74) *Attorney, Agent, or Firm* — Arc IP Law, PC; Joseph J. Mayo

(57) ABSTRACT

A method of protection of memory contents in a computer which includes the steps of loading a program into the computer and executing such program so that the memory contents of the computer are used to create and store on the same computer cryptographic hash tags uniquely identifying the contents for each of blocks of memory content of selected and consistent size and their location and applying this to all of the memory contents, analyzing the hash tags so as to identify those that have an identical memory content, recording such results of such analysis, then effecting a transfer to an independent memory a copy of the hash tags and the associated memory blocks as well as the other information regarding their location this being with the exception where the contents of a block are identical, and then transferring only one copy of such contents.

6 Claims, 21 Drawing Sheets

(51) Int. Cl.
*G06F 11/14* (2006.01)
*H04L 29/14* (2006.01)

(56) References Cited

U.S. PATENT DOCUMENTS

| | | | |
|---|---|---|---|
| 2004/0250033 A1* | 12/2004 | Prahlad et al. | 711/162 |
| 2005/0086241 A1* | 4/2005 | Ram et al. | 707/100 |
| 2006/0161576 A1* | 7/2006 | Barrs et al. | 707/102 |
| 2006/0224636 A1* | 10/2006 | Kathuria et al. | 707/200 |
| 2007/0271313 A1* | 11/2007 | Mizuno et al. | 707/202 |
| 2010/0250908 A1* | 9/2010 | Amann et al. | 713/1 |
| 2011/0161299 A1* | 6/2011 | Prahlad et al. | 707/649 |
| 2011/0282839 A1* | 11/2011 | Paksoy et al. | 707/640 |

OTHER PUBLICATIONS

International Preliminary Report on Patentabilitly received for PCT Appl. No. PCT/AU2012/001601, dated Apr. 8, 2014, 6 pages.

* cited by examiner

MEMORY CONTENT PROTECTION

This invention relates to memory content protection for a computer.

BACKGROUND OF THE INVENTION

It is now quite conventional to protect memory contents of a computer by copying the contents of such memory onto a remote memory which be used to restore the first memory contents in case of difficulties.

One problem with conventional protection techniques is an initial time required to transmit the contents of a first memory onto a remote memory then if needed, the time that might be needed to effectively download this in a restore process.

This is the result of larger and larger memory size that whereas at the time of writing, 500 GB of memory on a hard disc is quite normal and it could be expected in the future that much larger memory sizes will be conventionally used.

Further, normal techniques for backing up memory contents may not record and store applications and may only store data.

In the event of a catastrophic failure, memory contents in a computer can be completely disrupted which then requires the original applications to be reloaded from original sources. This is not always straight forward with storage disks and passwords being necessarily available.

A further difficulty also lies in the fact that any backup or remote memory storage will record if it is providing a remote memory backup service for a number of computers, similar or the same applications many times over.

OBJECT OF THE INVENTION

An object of this invention is to provide a method of protection of memory contents which can assist in reducing time needed to effect storage of memory contents in a remote memory storage and facilitate restoring memory contents or at the least provide the public with a useful alternative.

BRIEF DESCRIPTION OF THE INVENTION

In a first form of the invention, although this is not the only or broadest form, there is a method of protecting a memory content of a computer, the method including taking a snapshot of the memory content of the computer including the steps of:
  creating an index of the memory content of the computer;
  the index being a plurality of first segments of data;
  said first segments being cryptographically encoded;
  comparing said first segments of data to a set of second segments of data (90), the second segments of data being stored on a remote server and backing up only those first segments of data that are not present in the second segments of data to provide a snapshot of the memory content of a computer.

In preference, the snapshot is performed on predefined interval.

In a further form of the invention there is a method of removal or deletion of a virus on a computer system, the method including:
  analyzing memory segments of the computer system and comparing it with an earlier snapshot of the memory content (180);
  creating a list of file segment differences between the memory of the computer system and the earlier snapshot of the memory content and comparing the list of file segment differences with a list of predefined rules, wherein said predefined rules result in classifying a file segment in the list of file segment differences as either a wanted or unwanted file segment;
  deleting or removing the unwanted file segment from the memory of the computer system and replacing them with a corresponding file segment from the earlier snapshot.

A list of differences may also be compared at a sub file level such as a computer's registry using a list of predefined rules to determine the differences as either wanted or unwanted.

In a further form of this invention, there is proposed a method of protection of memory contents in a computer which includes the steps of loading a program into the computer and executing such program so that the memory contents of the computer are used to create and store on the same computer cryptographic hash tags uniquely identifying the contents for each of blocks of memory content of selected and consistent size and their location and applying this to all of the memory contents, analysing the hash tags so as to identify those that have an identical memory content, recording such results of such analysis, then effecting a transfer to an independent memory a copy of the hash tags and the associated memory blocks as well as the other information regarding their location this being with the exception where the contents of a block are identical, and then transferring only one copy of such contents.

In preference, the block size in each case is identical one to the other.

In preference the block size is of relatively small size.

In preference, the independent memory is a remote memory controlled by an independent computer.

Traditionally, such back up for an independent memory connected to commercial back up services and transmission can be by way of conventional transmission techniques including use of internet or other protocols such as file transfer protocol for such transfer.

In preference the invention uses custom protocol over TCP/UDP to communicate with remote server.

The protocol uses variable sized packet scheme, each packet has a Header (150), Type (151), Sub Type (152), Flags (153), Data Size (154), Data (155) and optionally checksum (156).

Where header is a magic number indicating the start of packet, Type indicates the type of packet, protocol works like virtual channels, Depending upon Packet Type, there may be one or more than one Sub-Types, Flags indicate an operation on data (like compression and/or encryption and checksum presence). DataSize indicates the size of data in the packet, it may range from zero to $2^{31}$. Data field contains all user data in the packet, in case Data Size is zero, Data Field is skipped from the packet. Optionally there may exist a Checksum field, checksum field is added to packet if sending through UDP.

In preference, the independent memory is controlled by a computer which also has a program that can respond to requests from the first computer and can provide a download upon such request of any of the blocks of memory content or uploads of new data.

In preference, the memory contents would therefore include all of the contents of memory other than that stored in temporary storage locations and therefore would include all of the contents of the typically a hard disc drive and any memory that would have its contents remain even when power is removed from such memory.

In preference, as an indicative indication of the size of a block of memory this would be 4096 KB.

In preference, subsequent to a copying of the memory contents on a remote memory storage, whenever the computer is active and changes some of the memory contents that are relevant to the memory of interest, the method is further arranged so that for each of the memory blocks in which the content is changed from that which previously existed, and where the cryptographic hash tag is effectively changed, such altered block of memory will be further analysed so as to identify whether it now is identical to the memory contents of other of the other blocks and in the event that it is not identical to any of the other blocks transmitting such modified information thereafter to the remote memory storage where it is only those altered blocks and appropriate information that is transferred.

A further form of the invention resides in a method of removal of unwanted data on a computer system, the method including taking at least one snapshot of the memory content of the computer prior to a computer virus or malware infection being inserted or activated on the computer including the steps of: creating an index of the memory content of the computer the index being a plurality of first segments of data, generating and allocating cryptographic hash tags that uniquely identify the contents of each segment of data and their location; storing the plurality of first segments of data and their associated cryptographic hash tags on a remote memory device; detecting a virus or a malware infection on the computer and initiating a restoration process, including the steps of: creating an index of the memory content of the computer after the virus or malware infection has been detected, the index being a plurality of second segments of data; analyzing the second segments of data with the first segment of data and creating a list of segment differences; classifying the list of segment differences according to a set of predefined rules wherein said predefined rules result in classifying a file segment in the list of file segment differences as either a wanted or unwanted file segment; removing the unwanted second file segment(s) from the memory of the computer system and replacing them with a corresponding file segment from the at least one snapshot Significant advantages arise from this method.

Firstly, it is found that it can save significant volume of memory storage and in some cases up to 50% less storage is required in a remote storage facility.

Further, it also significantly reduces the time therefore needed to transmit memory content in the first instance where typical memory contents will include blocks that consistently have the same content.

A further significant advantage is the fact that when a restoration is called for, this can be provided on a basis that provides and can provide an identical restoration to the original status of the memory contents.

Using a cryptographic hash tag allows for each block of memory content to be uniquely identified and while there is a theoretical ultimate limit to the number of variations that can be uniquely identified, it is currently considered that this would not normally be reached computers and memory content of current sizes.

BRIEF DESCRIPTION OF THE DRAWINGS

By way of example, an embodiment of the invention is described more fully hereinafter with reference to the accompanying drawings, in which.

DESCRIPTION OF THE INVENTION

Figure 1:
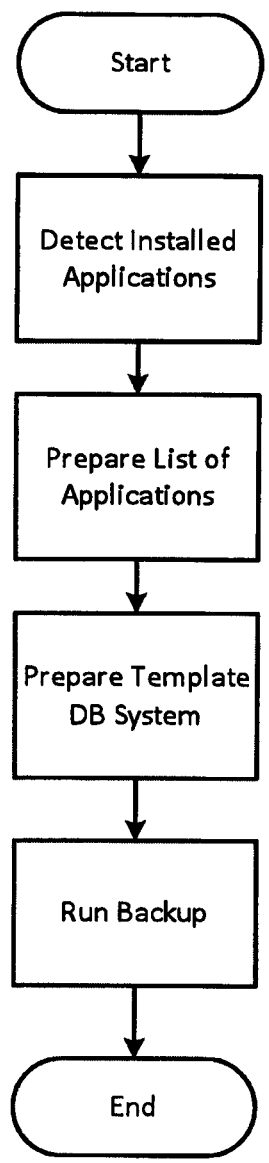
FIG. 1 is a top level overall process of creating snapshots.
Figure 2:
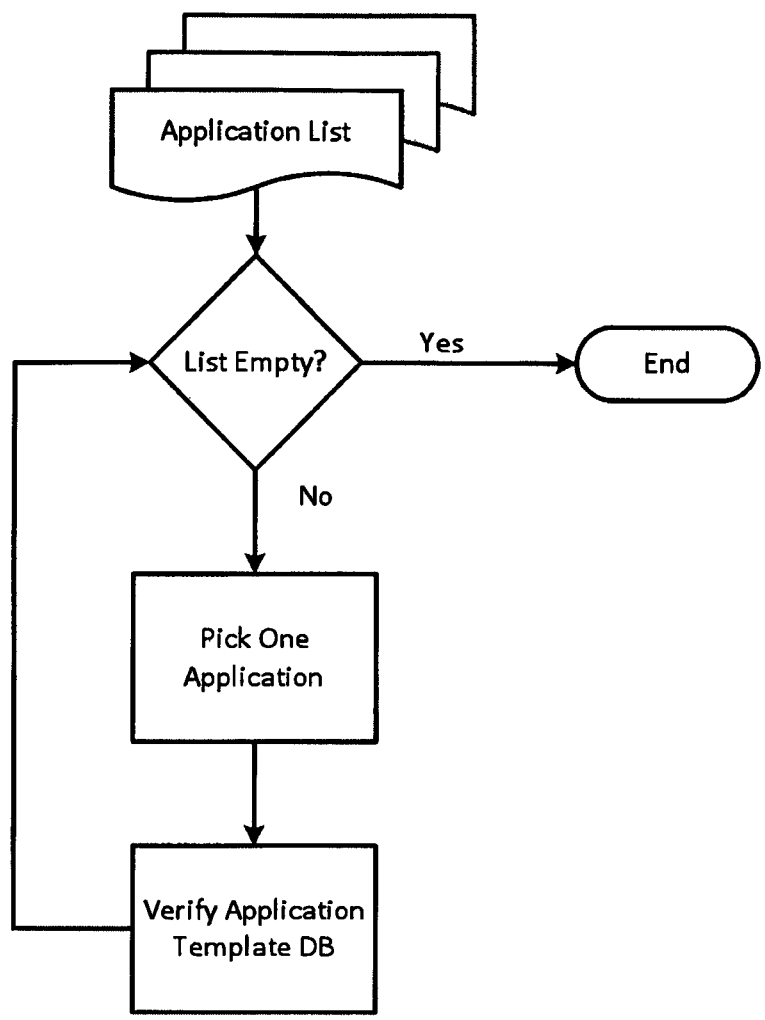
FIG. 2 is the process to prepare system template database.
Figure 3:
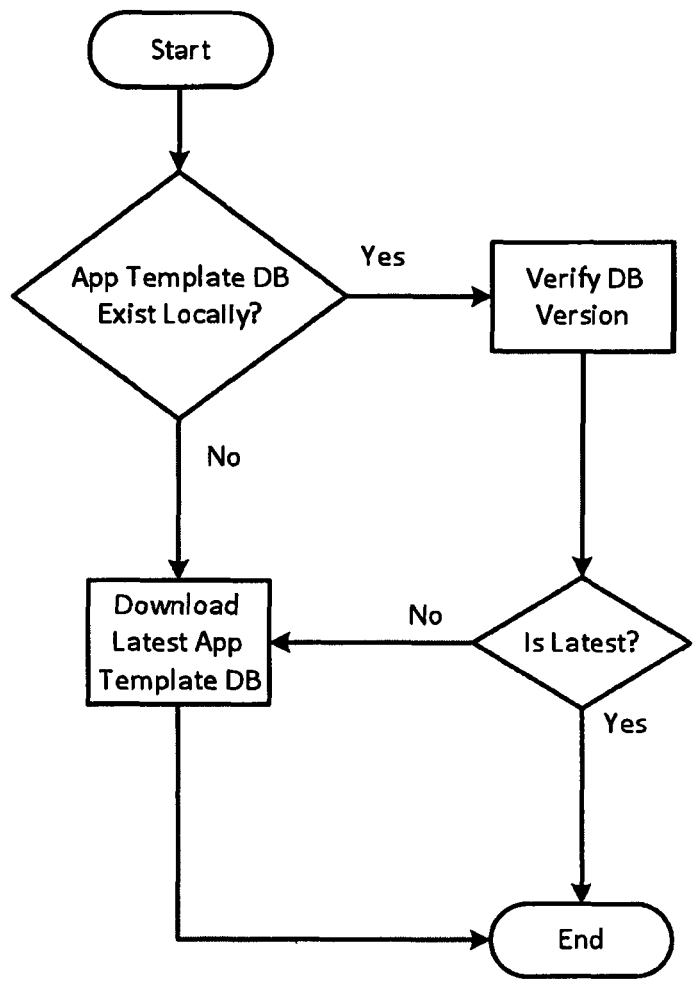
FIG. 3 is the process to verify integrity of template database for single application.
Figure 4:
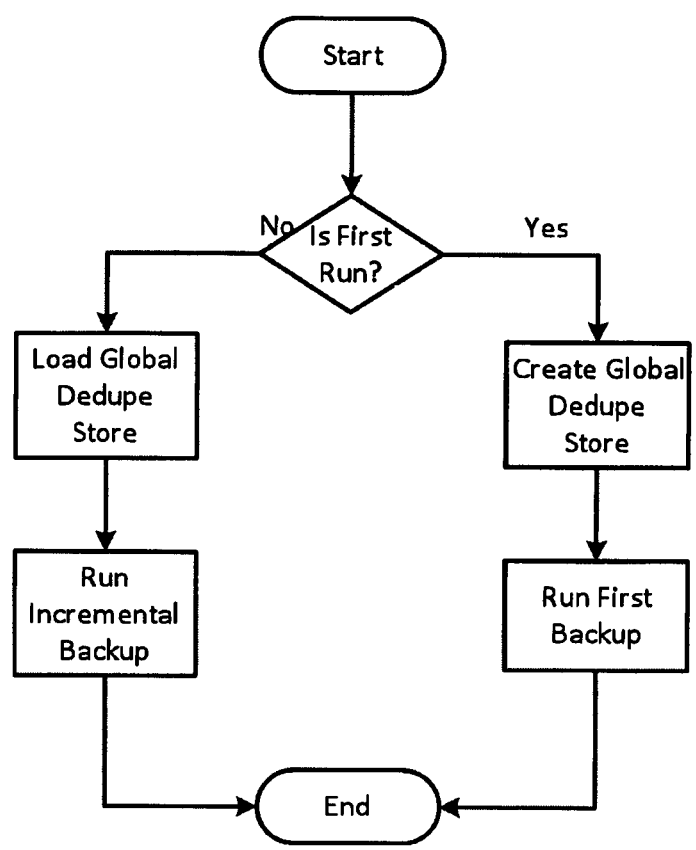
FIG. 4 is a top level backup process.
Figure 5:
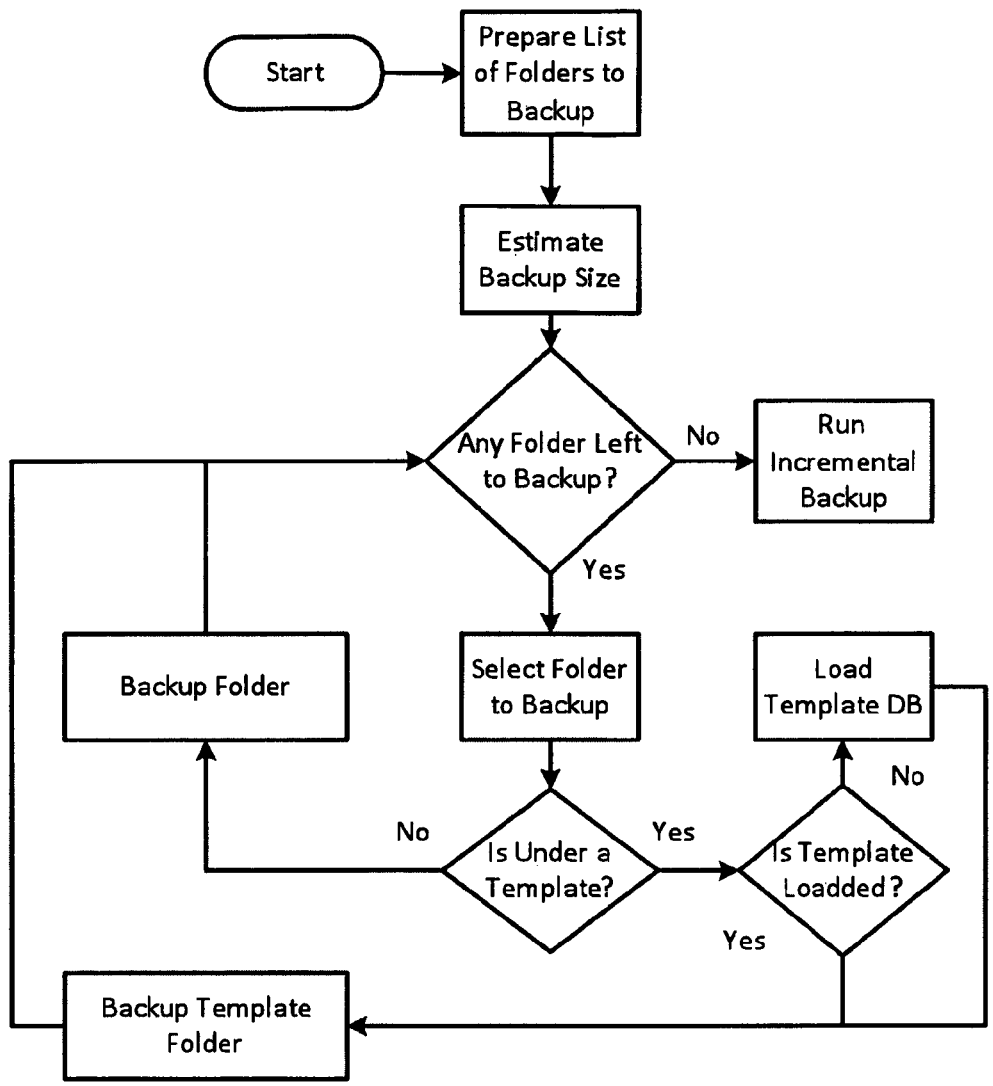
FIG. 5 describes the sequence of operations for first backup.
Figure 6:
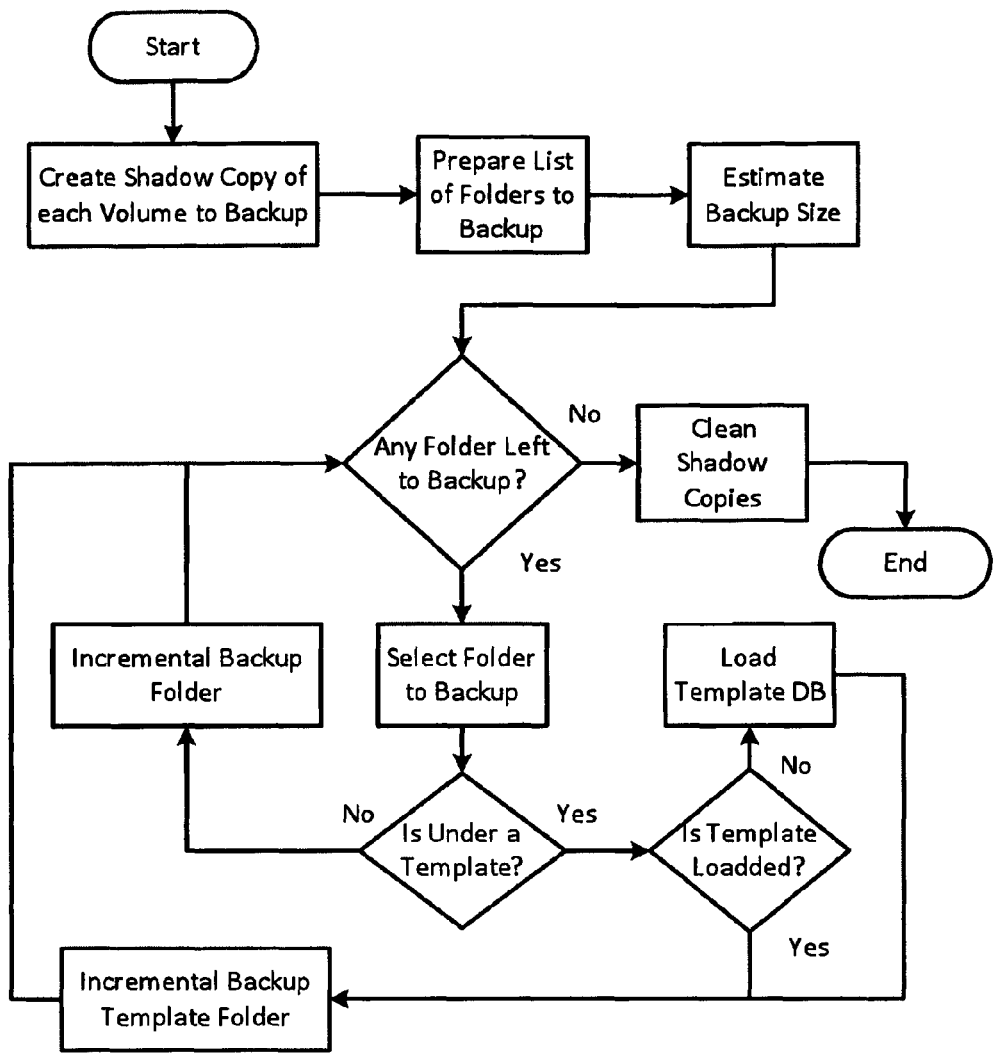
FIG. 6 describes the sequences of operations for subsequent (incremental) backups.
Figure 7:
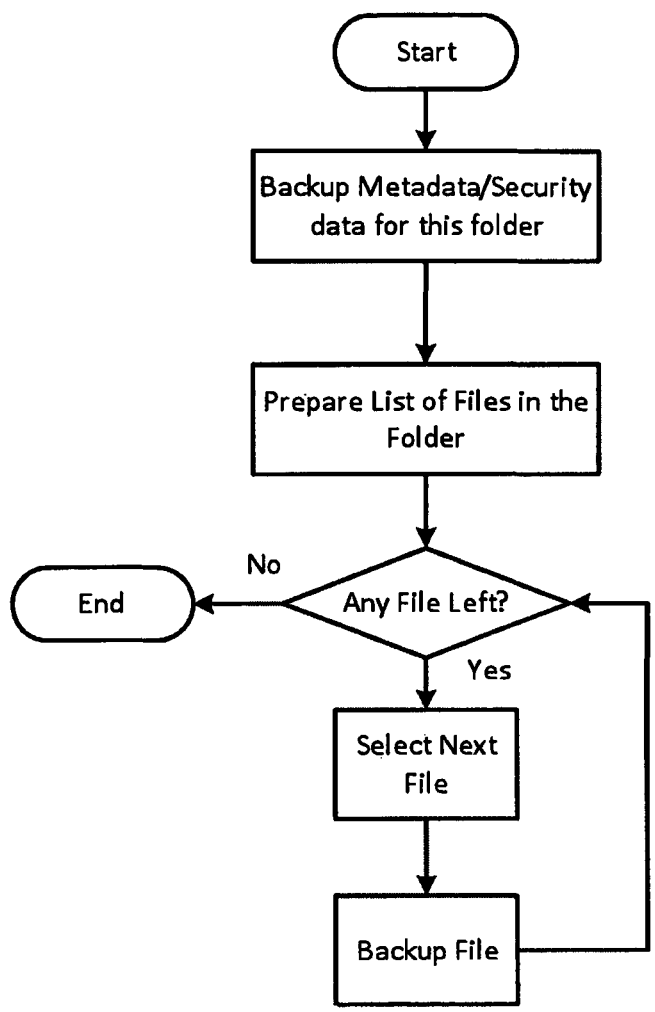
FIG. 7 displays steps to backup a folder.
Figure 8:
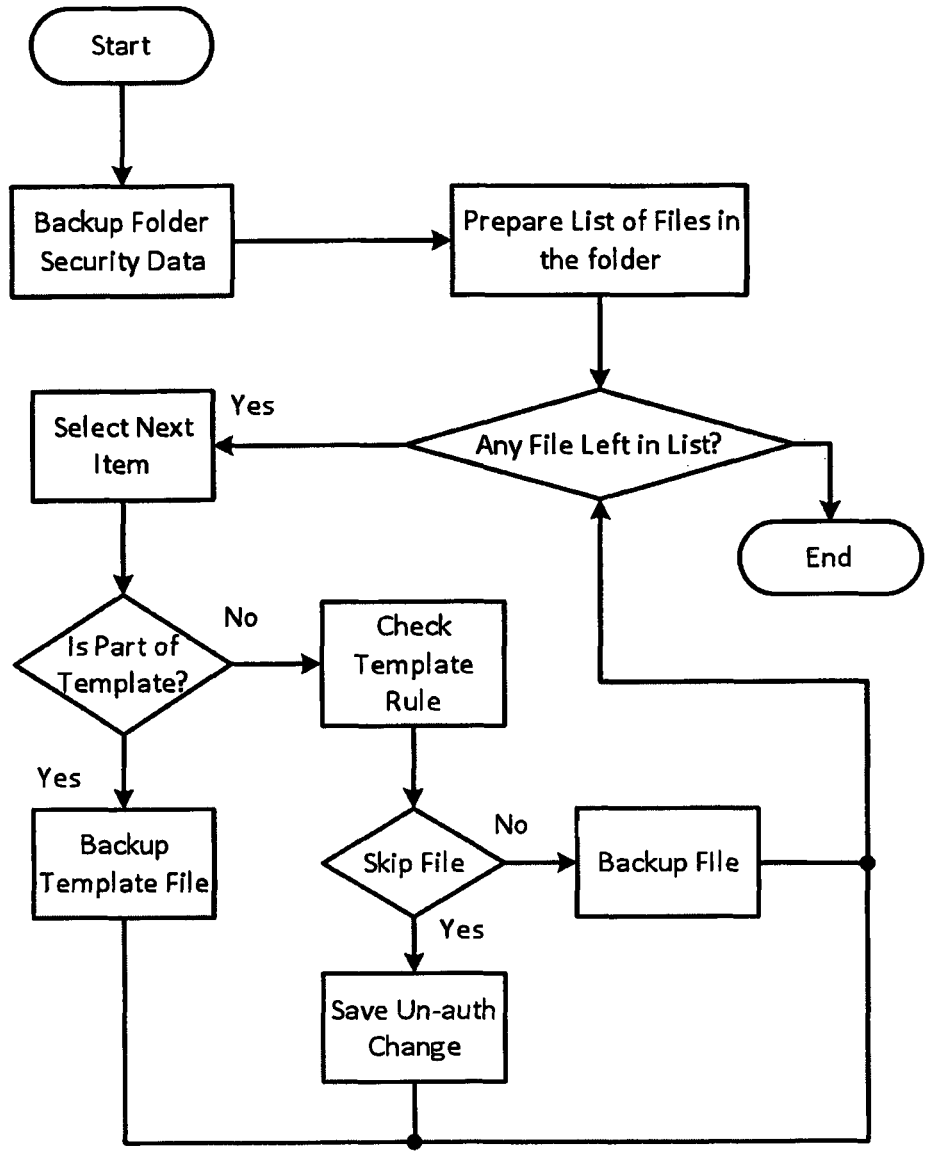
FIG. 8 is the process to back a folder which is under template system.
Figure 9:
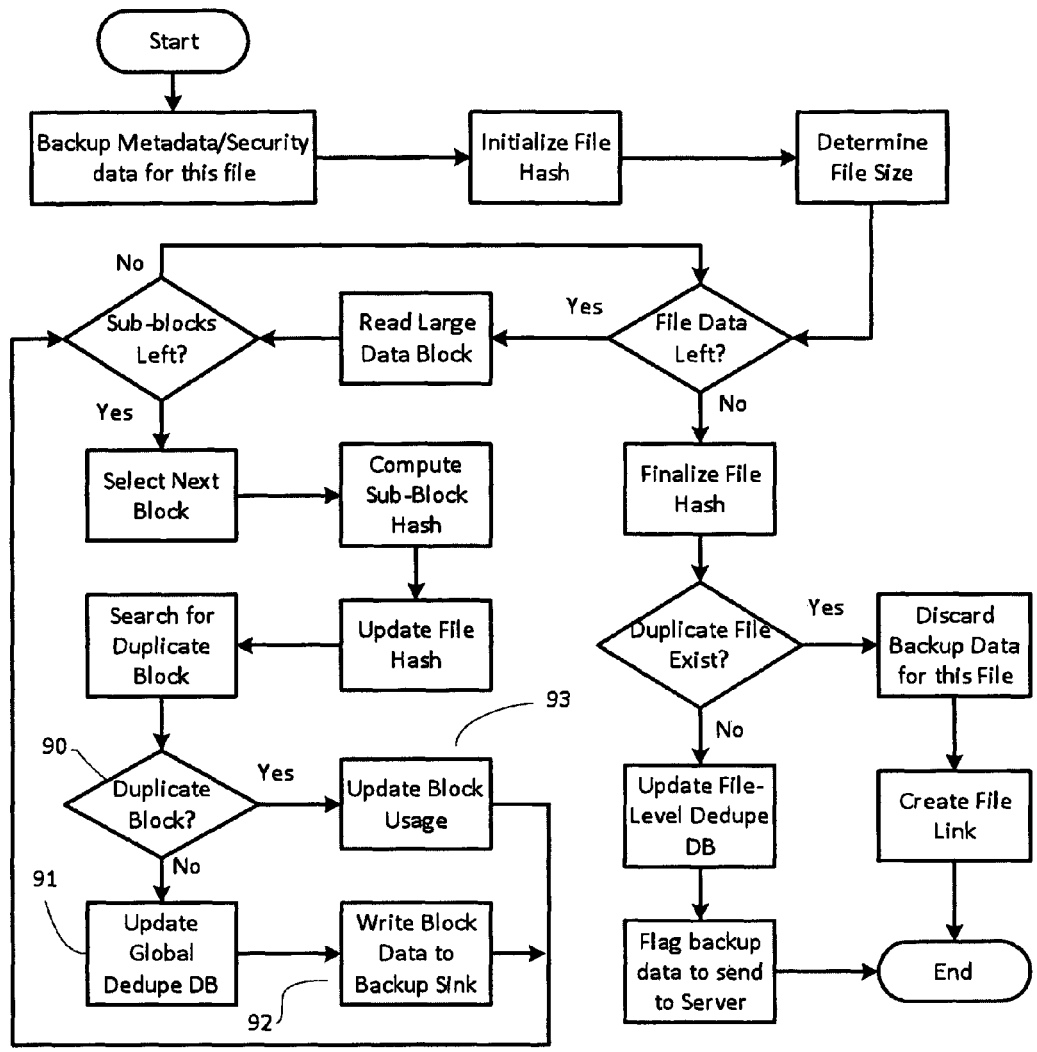
FIG. 9 is the top level process to backup a single file which is not part of template.
Figure 10:
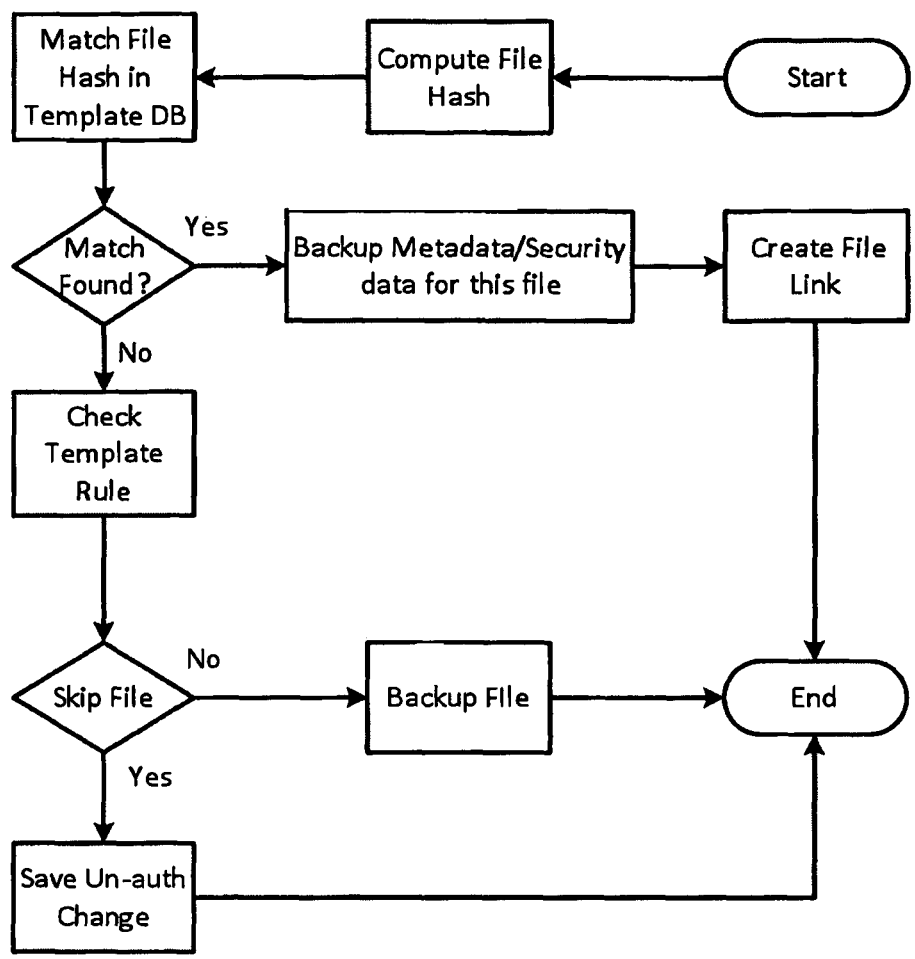
FIG. 10 is the top level process to backup a file which is under a template.
Figure 11:
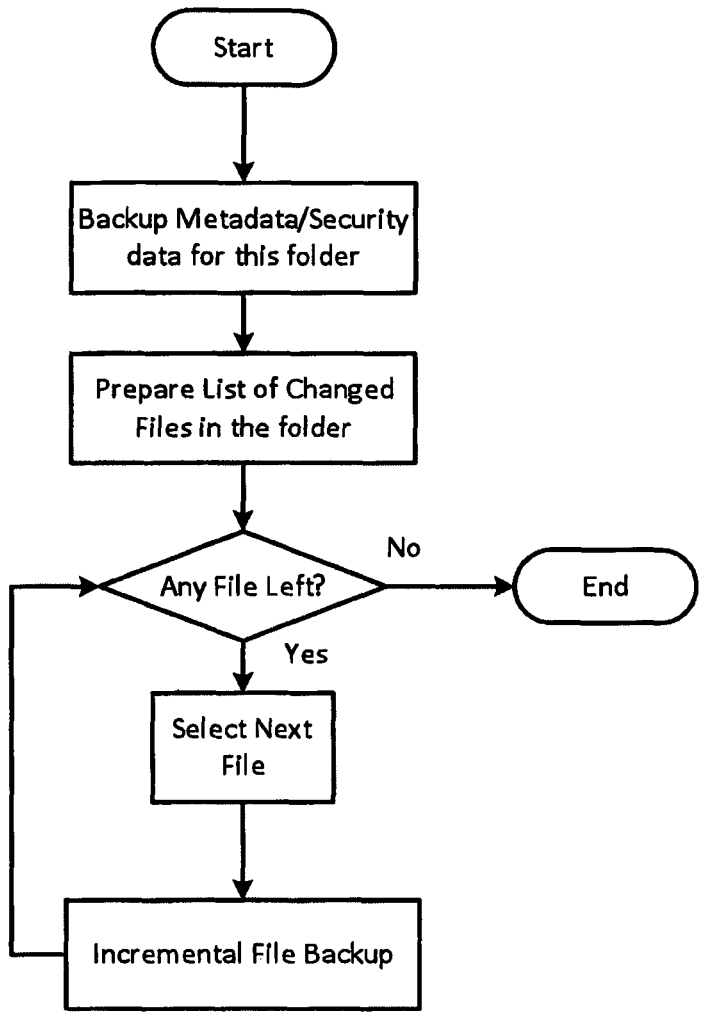
FIG. 11 is the process to do incremental backup of a folder which is not under a template.
Figure 12:
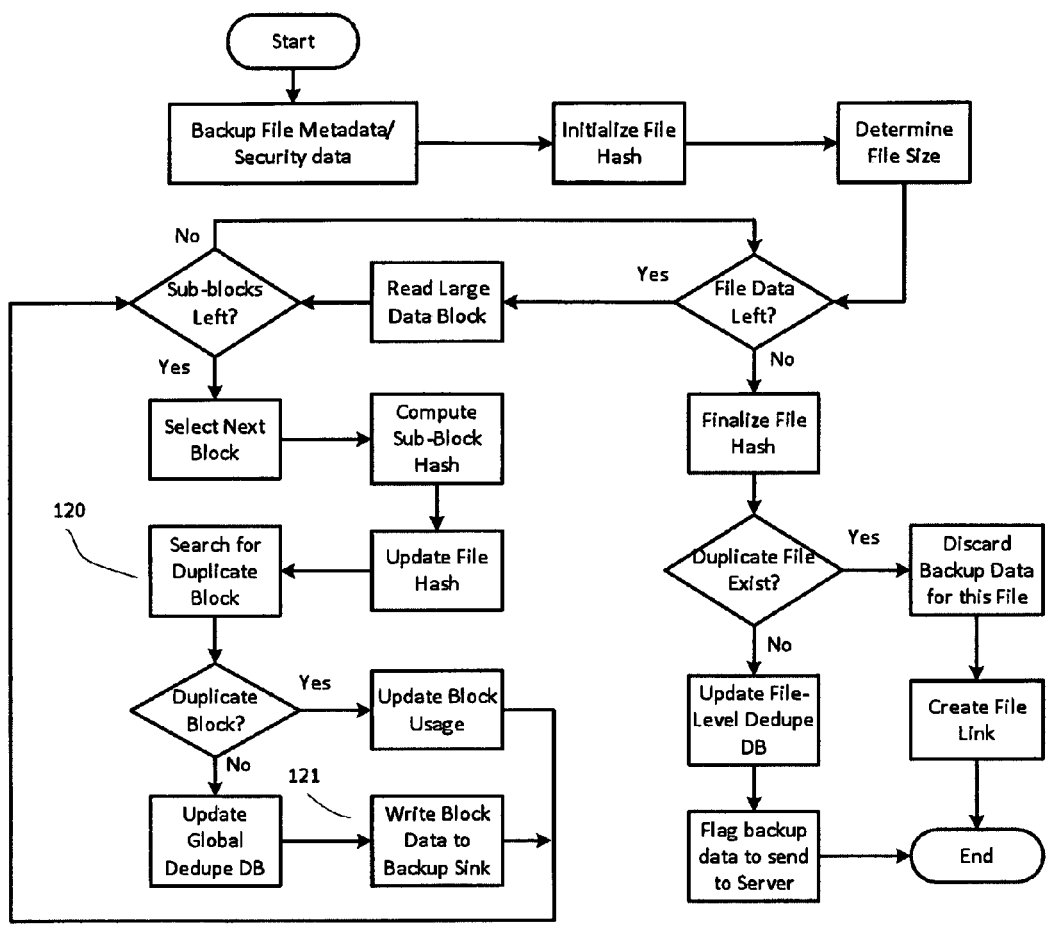
FIG. 12 is the process to do incremental backup of a file which is not under a template.
Figure 13:
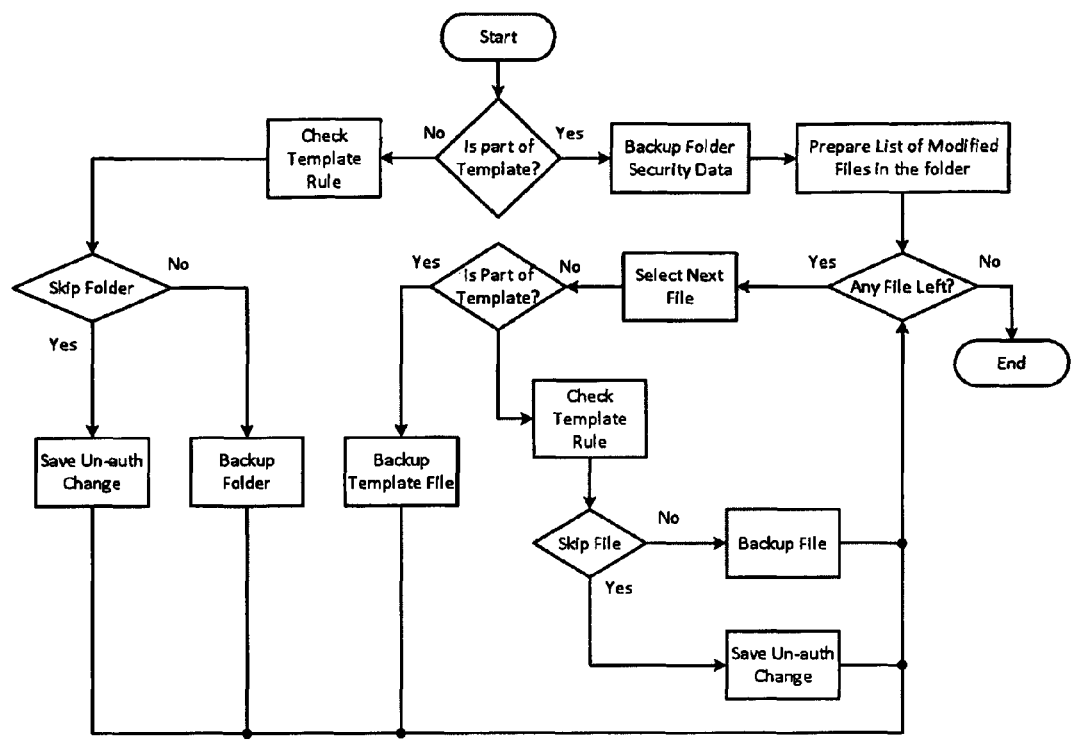
FIG. 13 is the process to do incremental backup of a folder which is under a template.
Figure 14:
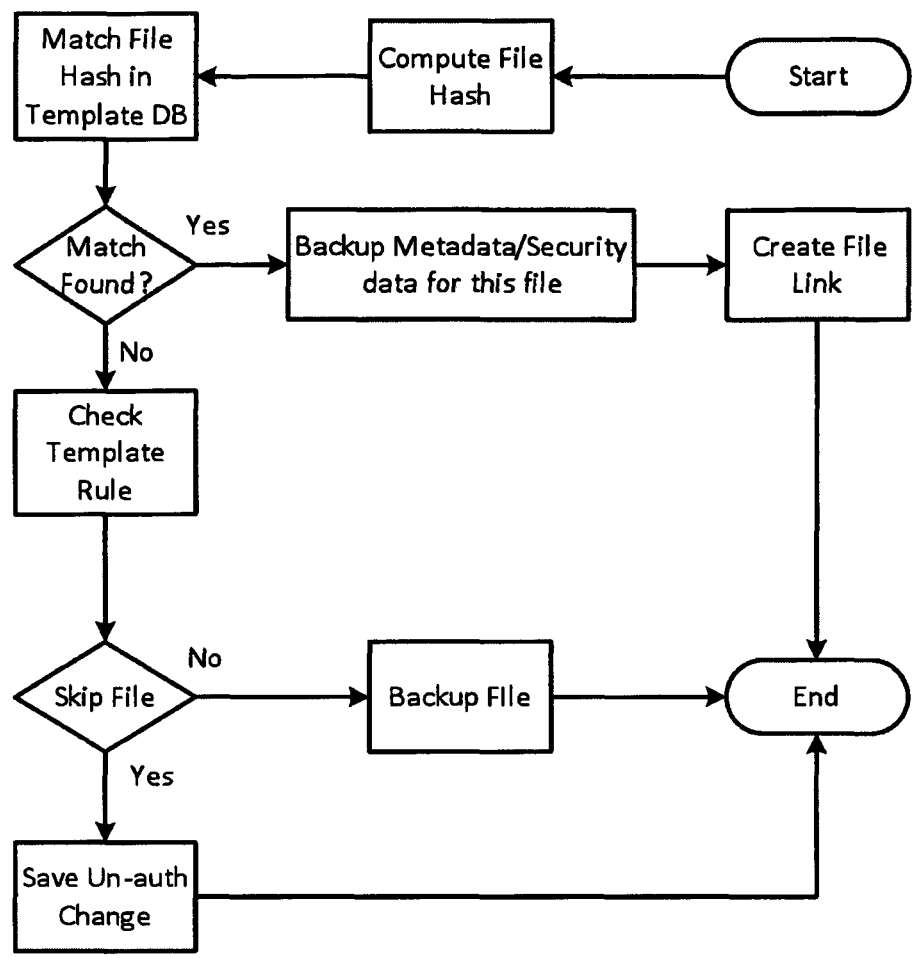
FIG. 14 is the process to backup a file (during incremental backup) which is under a template.
Figure 15:
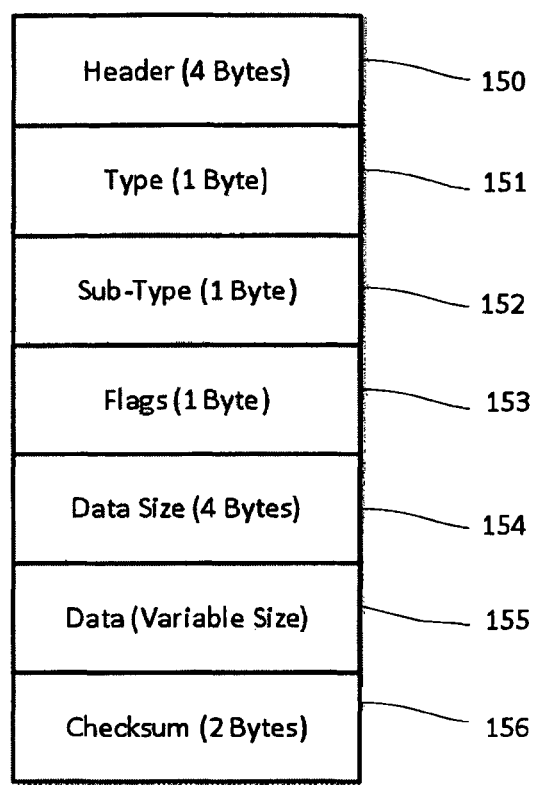
FIG. 15 describes a single packet of the protocol.
Figure 16:
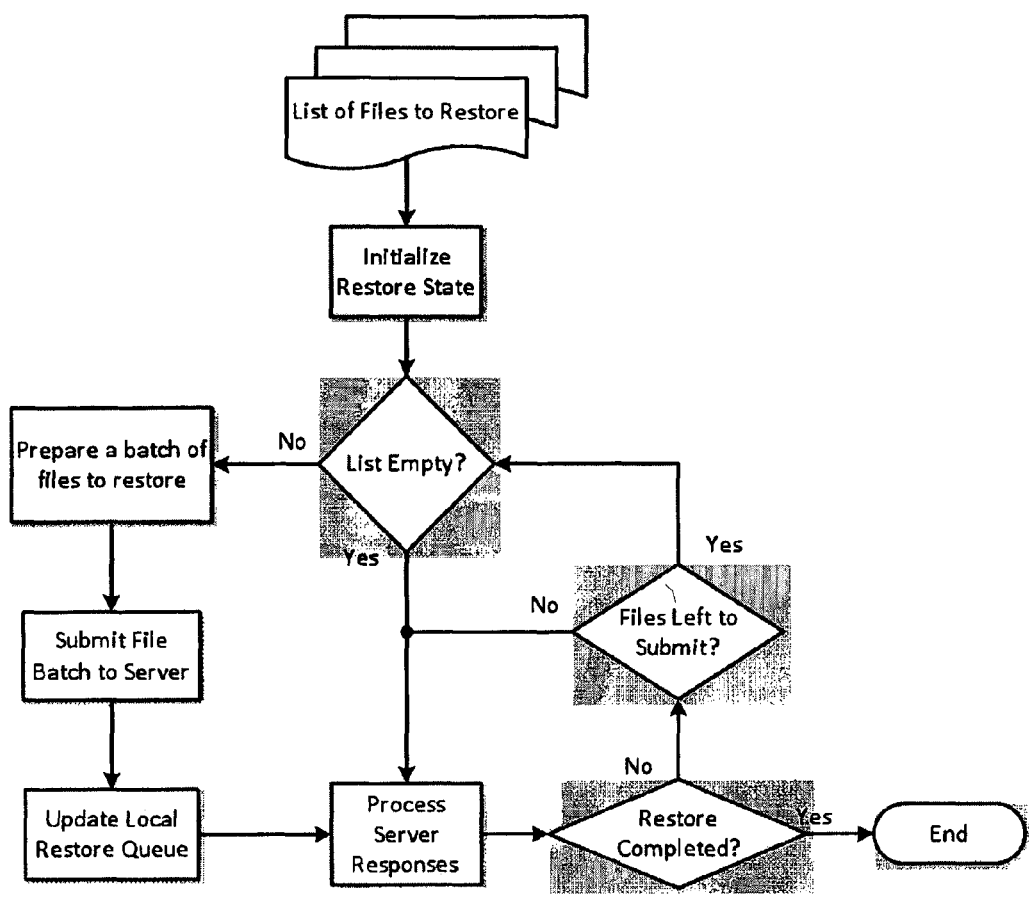
FIG. 16 describes the restore process when initiated from application GUI. Where the user selects files and folders to restore.
Figure 17:
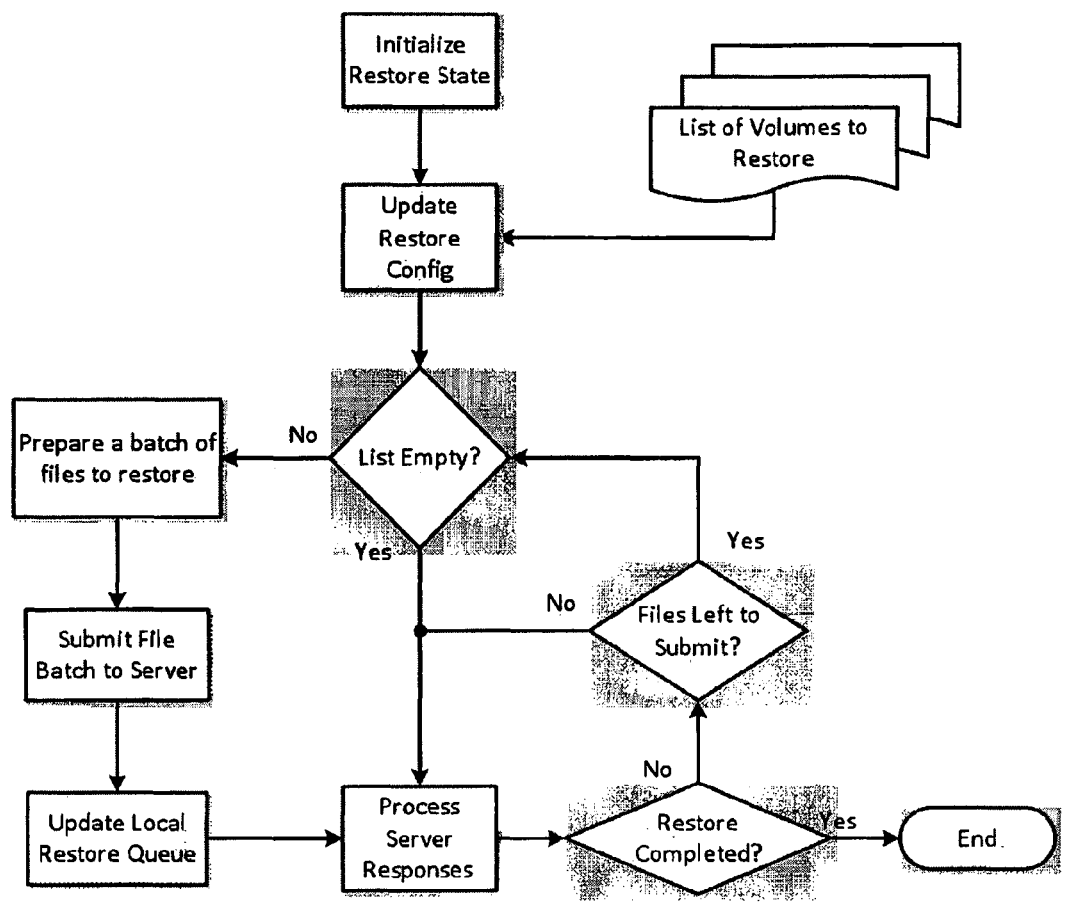
FIG. 17 describes a full System Recovery (Restore). This process is initiated from recovery program which starts from bootable recovery CD. In this process the user selects volumes he/she want to recover.
Figure 18:
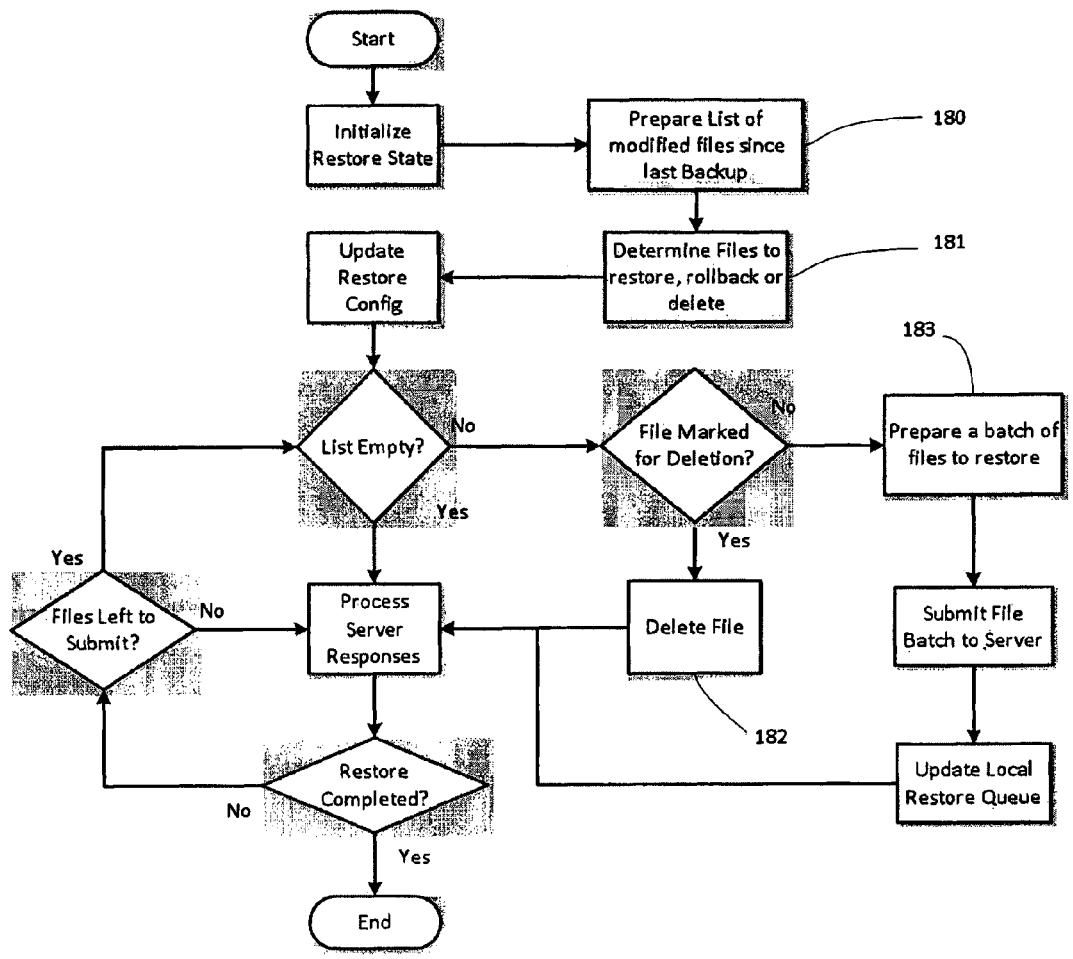
FIG. 18 describes an Antivirus/Antimalware based recovery. List of all new and modified files is prepared, then AV rules DB is used to determine files which need rollback or deletion. If some files have been deleted, they will also be restored during this process.
Figure 19:
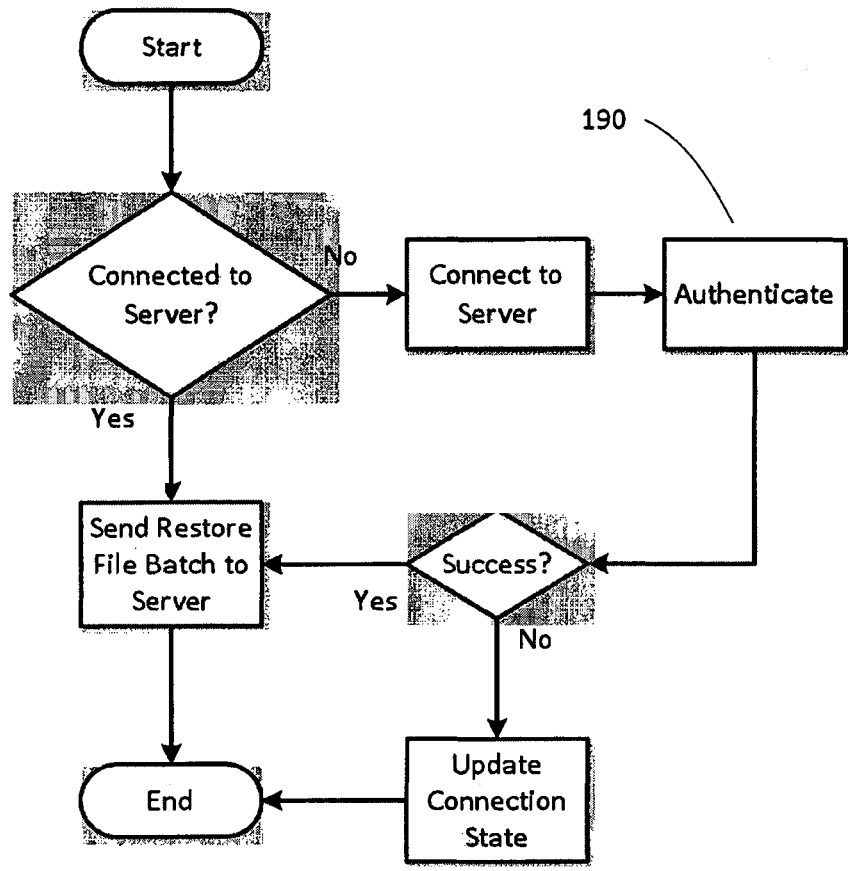
FIG. 19 describes the operations during restore initialization.
Figure 20:
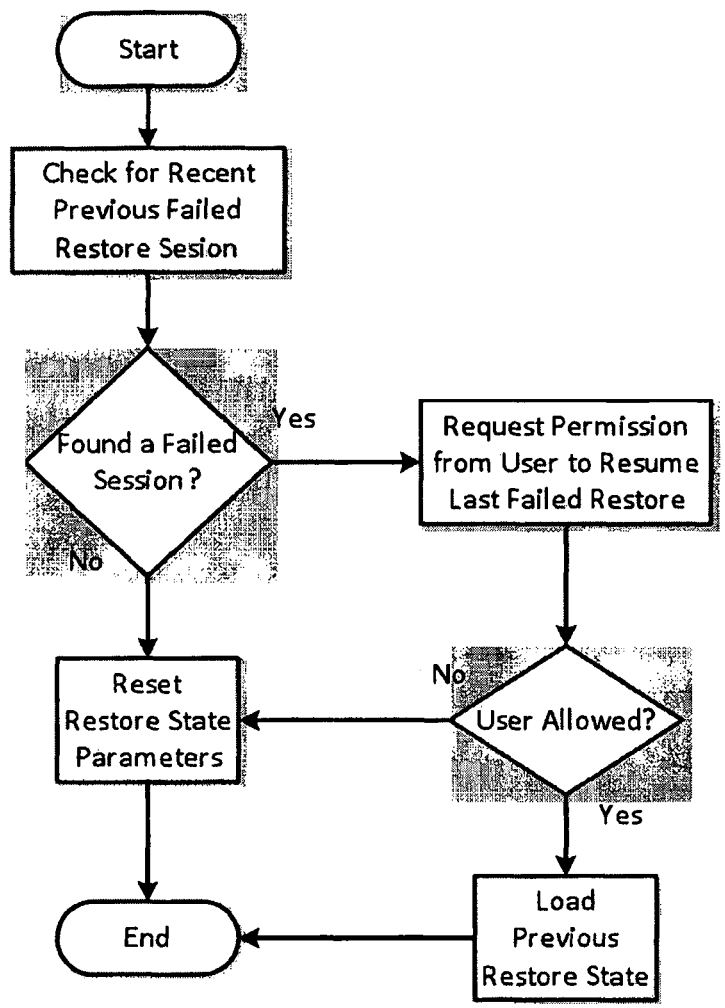
FIG. 20 describes the process of connecting to server to submit restore file batch. Once a connection is made, it is kept alive until restore complete or a fault occurs.
Figure 21:
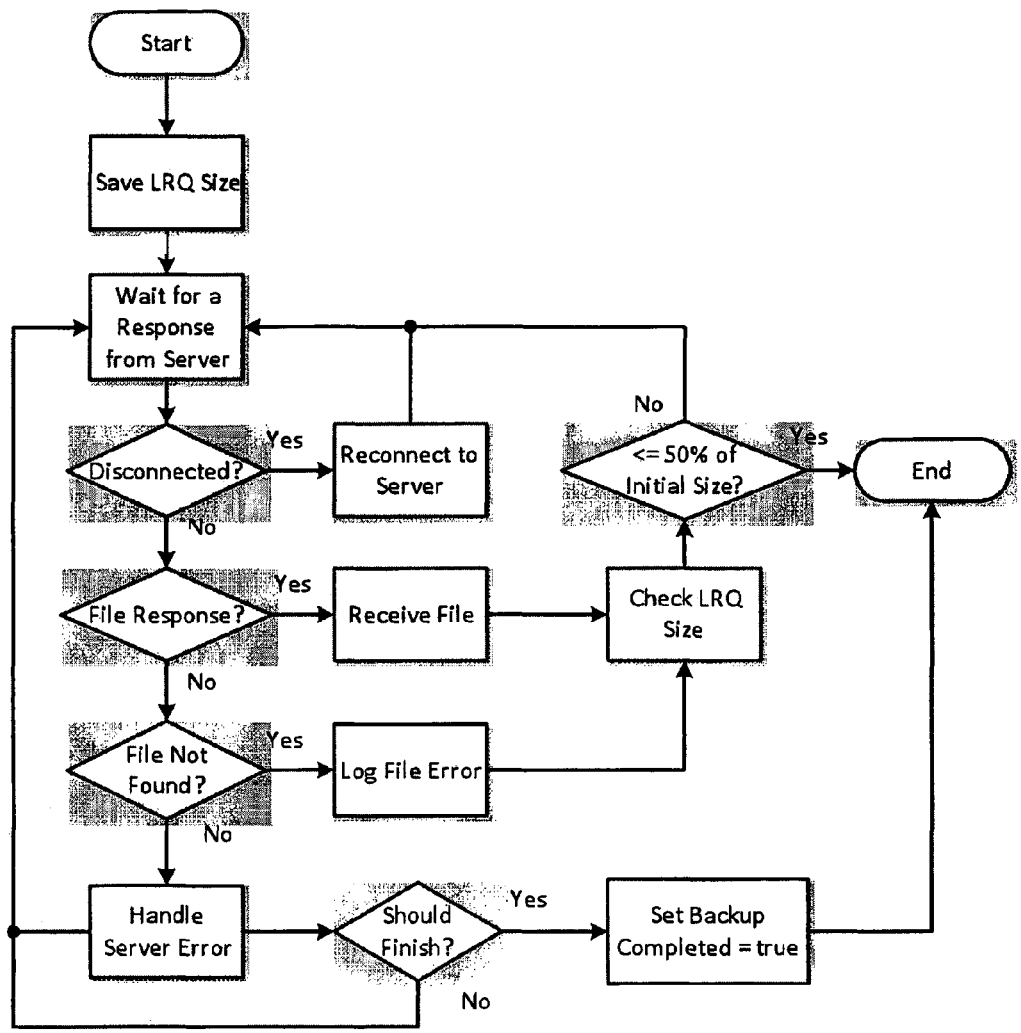
FIG. 21 describes the flow of processing server responses. The server sends asynchronous responses to different requests sent to it.

For a better understanding of this invention it will be described now with reference to an actual application where some of the specifics related to the method and apparatus appropriate for this method can be further detailed.

For the present invention to establish the baseline memory capture, the system installs a unique piece of software code onto the target device memory. This software creates an index of the memory contents of the device in a series of segments of data of a predominately uniform size (the last segment may be smaller than the standard segment size), which represent a segment of the devices' memory, and is cryptographically encoded, such encoded segments forming the contents of the index.

As each data block may not be unique, it is compared by the software to known segments of data (90), whose indices are stored locally (91) and whose data is already stored on a remote server, and only the contents of those segments that are newly unique are flagged for backup (92), whilst the known segments are recorded as being present on the target device, but are not required to be uploaded.

This process of identification and reference to known segments of data allows for a reduction in time and network resources used to make the initial and copy of the target devices memory.

Once the index of the target devices memory has been completed, and compared to known index's, the new data segments are then uploaded to the remote server memory storage facility.

The next time the software runs, it reindexes the target devices memory, and compares the new index to the previous index (120), and flags the changes identified for upload to the remote server (121). The previous data segments will not change if the files themselves have not been modified. This new index and new data segments are then uploaded and stored on the remote server as a new snapshot of the target devices memory, and all such snapshots are stored on the remote server, each snapshot varying to the previous snapshot by the changes made on the target devices memory during the time interval between snapshots.

All memory snapshots stored on the remote server are available to the user at any time, either in full or in part.

Target device memory restoration.

In the case of a corrupted memory contents or storage device on the target device, it is possible to take the previous snapshot of the target devices memory stored on the remote server and download it back onto the target devices memory storage if the memory storage device's are usable, or onto new memory storage devices if the previous ones are unusable.

In the case of a damaged physical memory device, the following process would be followed:

Install a new physical memory storage device into the target device, and install the Boot CD, recovery CD or other suitable bootable devices such as but not limited to a bootable USB device, or bootable recovery partition, followed by the restoration software program.

The restoration software then executes and connects to the remote server via the internet and the user account details are entered and verified (190). A list of user's computers is presented, where user selects the computer to recover, then a list of the available snapshots of the target devices memory contents is shown, and from that list the desired snapshot is selected and downloaded either online, or sent in the form of a physical portable memory storage device delivered to the user.

This memory content snapshot is then installed onto the target device (200). Reinstating the target device to normal operation, with the only loss of memory contents being the changes made since the last snapshot. This reinstatement covers all programs, setup files and data files.

In the case where the physical memory storage device was undamaged, but the contents unusable the following process would be undertaken.

If the target devices physical memory devices are working, the only difference is that the restoration program is installed from the recovery CD onto the target devices physical memory and the process of selecting the snapshot and installing it is as above.

To achieve this, the physical memory device on the target computer is wiped clean, the boot CD recovery CD or other suitable bootable devices such as but not limited to a bootable USB device, or bootable recovery partition, is installed followed by the restoration component of the software.

The target computer then connects to the remote server and confirms identity and account details.

Once complete, a list of available snapshots is shown, from which one is selected and downloaded/installed onto the target users device and the memory contents of the target device are restored in full. The target device can resume normal operation with the only loss of data being the changes made since the last snapshot was made.

In the case of a target device memory only losing a part of its memory—for example a file is accidently deleted, then a partial restore can be undertaken.

In this case, the target device connects to the remote server and searches for the file that has been damaged/deleted and selects from the available versions the desired copy.

The software then restores the chosen version of the file back to the target devices memory and overwrites the damaged version or reinstates the file.

Virus detection and removal process and damaged file restoration.

In the case of a user's computer memory contents which is affected by a virus, the software can reverse its effects and remove it from the computer entirely with minimal or no loss of memory.

To do this, the process of making a snapshot backup has to have occurred and continued on a regular basis.

The software will analyse the contents of the computer memory and revise it against a previous snapshot, before the damage occurred.

The list of differences (180) will be compared against a rule base database on the remote server, such rules determining the action to be taken in regards particular types of changes.

The rules may result in one of the following actions, removal of the file (182), roll back the file (183), or keep/allow the changes.

Once a change has been identified as being unwanted for example, the software will roll back that change by restoring the affected files to where they were as at the previous snapshot. In effect removing the virus infection altogether.

In addition, the partial restore feature can be used repeatedly to find the source of infection until it is found and removed altogether.

The process of removing the changes made by a virus and the virus itself by removing the changes they cause by rolling back the changes is far more secure and effective than just quarantining an infected file, as this does not repair the damage.

The ability to remove damage from an infected memory block without affecting the rest of the computer's memory is also of benefit.

A key benefit of such a process is that in normal circumstances, a virus infection is difficult to remove if at all, and often the files affected by the virus are lost altogether. As such, significant timesaving's and memory protection are achieved with the use of the present invention.

Various modifications may be made in details of design and construction [and process steps, parameters of operation etc without departing from the scope and ambit of the invention.

The invention claimed is:

1. A method of removal of unwanted data on a computer system, the method including taking at least one snapshot of the memory content of the computer prior to a computer virus or malware infection being inserted or activated on the computer including the steps of:

creating an index of the memory content of the computer, wherein the index is a plurality of first segments of data;

generating and allocating cryptographic hash tags that uniquely identify the contents of each segment of data and their location of the plurality of first segments of data;

storing the plurality of first segments of data and their associated cryptographic hash tags on a remote memory device; and, detecting a virus or a malware infection on the computer and initiating a restoration process, including the steps of:

creating an index of the memory content of the computer after the virus or malware infection has been detected, wherein the index is a plurality of second segments of data;

analyzing the plurality of second segments of data with the plurality of first segments of data and creating a list of segment differences;

classifying the list of segment differences according to a set of predefined rules, wherein said predefined rules result in classifying a file segment in the list of segment differences as either a wanted or unwanted second file segment or segments; and, removing the unwanted second file segment or segments from the memory of the computer system and replacing the unwanted second file segment or segments with a corresponding file segment from the at least one snapshot.

2. The method of claim 1, wherein the plurality of first segments of data and the plurality of second segments of data are the same size.

3. The method of claim 1, wherein the remote memory device is a remote server.

4. The method of claim 1, wherein the remote memory device is a USB memory stick.

5. The method of claim 1, wherein the unwanted data on the computer system is as a result of a computer virus.

6. The method of claim 1, wherein the unwanted data on the computer system is as a result of malicious software.

* * * * *